United States Patent Office 3,242,208
Patented Mar. 22, 1966

1

3,242,208

BIS (TRIFLUOROMETHYL) THIO CARBANILIDES

Henry Martin, Basel, Switzerland, assignor to Ciba Limited, Basel, Switzerland, a company of Switzerland
No Drawing. Filed Feb. 18, 1965, Ser. No. 433,776
Claims priority, application Switzerland, Apr. 21, 1961, 4,682/61
6 Claims. (Cl. 260—552)

This is a continuation-in-part of my application, Serial No. 323,539, filed October 28, 1963, now abandoned, and of application Serial No. 188,521, filed April 18, 1962, now Patent No. 3,151,023.

The present invention provides compounds of the Formula I

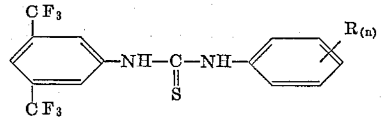

in which R represents a member selected from the group consisting of a fluorine, chlorine and bromine atom, a lower alkyl, alkoxy, —$CF_3$, —$SO_2NH_2$, —$NO_2$, —CN, —SCN, —$NR_2'$, —COOR', —$SO_2R'$, —COR' and —SR' group, wherein R' has the meaning of a lower alkyl group and $n$ is a whole number of at most 3.

The compounds of the general Formula I have a pronounced action against fungi and bacteria that cause plant diseases. These compounds are especially active against phytopathogenic fungi.

In this connection it is an important advantage that, when used at concentrations such as are required for the combating of parasites, the aforesaid compounds have no toxic side-effects on crop plants.

Furthermore, the compounds of the above Formula I exhibit an excellent action against certain phytopathogenic bacteria such, for example, as those of the genus Corynebacterium. A particularly strong anti-bacterial action is exhibited, for example, by the compound of the formula

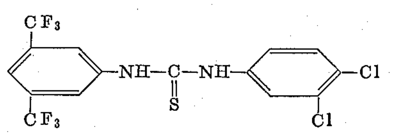

which, even when used at a concentration of 0.001 part per million, still exhibits an inhibitive action, as can be demonstrated, for example, by a dilution test with a culture of *Staphylococcus aureus* in glucose broth.

It is especially important that the compounds of the invention do not lose their action against phytopathogenic microorganisms in the presence of surface-active substances.

As examples of the use of the compounds of the general Formula I for plant protection there may be mentioned the treatment of plant seeds and of plants in various stages of development, and also treatment of the soil in which the plants grow, to protect them from harmful microorganisms.

The compounds of the general Formula I can be made by methods in themselves known. For example, a compound of the general formula

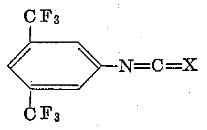

2 in which X represents a sulfur atom, may be reacted with a compound of the general formula

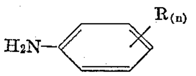

in which R and $n$ have the meanings given in defining the above general Formula I; or a compound of the general formula

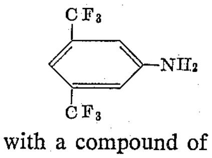

may be reacted with a compound of the general formula

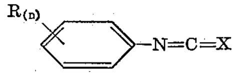

in which R, $n$ and X have the meanings given above.

Thus, to make a compound of the general Formula I, for example, 3:5-bis-trifluoromethylphenyl isothiocyanate is reacted with one of the following compounds:

Aniline or a substituted aniline such, for example, as para-chloraniline, 3:4-dichloraniline, 3:5-dichloraniline, 2:5-dichloraniline, 3:4:5-trichloraniline, 2:4:5-trichloraniline, 3-chloro-4-bromaniline, 3-chloro-4-methoxyaniline, 3-chloro-4-methylaniline, 3-trifluoromethylaniline, 2-chloro-5-trifluoromethylaniline, 3-trifluoromethyl-4-chloraniline, 3:5-bis-trifluoromethylaniline, 4-bromaniline, 2:4-dichloraniline, 4-aminobenzenesulfonylamide, 4-aminobenzoic acid methyl ester, 4-butoxyaniline, 4-thiocyaniline, 4-aminoacetophenone, 4-aminophenylacetic acid methyl ester, 3-bromaniline, 4-chloro-3-methylaniline, 4-chloro-2-methylaniline, 3:5-dichloro-4-methylaniline or 4-chloro-3:5-dimethylaniline; hydroxyaminobenzenes such, for example, as 4-chloro-2-amino-1-hydroxybenzene, 5-chloro-2-amino-1-hydroxybenzene, 4:5-dichloro-2-amino-1-hydroxybenzene, 3:4:6-trichloro-2-amino-1-hydroxybenzene, 4- or 5-bromo-2-amino-1-hydroxybenzene, 4:6-dibromo- or 4:6-dichloro-2-amino-1-hydroxybenzene, 4:5-dibromo-2-amino-1-hydroxybenzene, or 4-chloro-3-trifluoromethyl-2-amino-1-hydroxybenzene.

Alternatively, 3:5-bis-trifluoraniline may be reacted with a phenyl isothiocyanate, for example, one that contains one or more nitro groups, such as 4-nitrophenyl isothio-cyanate, 3-nitro- or 2-nitro-phenyl isothio-cyanate, 4-methyl-3-nitrophenyl isothio-cyanate, 4-chloro-3-nitrophenyl isothio-cyanate, 2-nitro-4-chlorophenyl isothiocyanate, 2-methyl-4-nitro-5-chlorophenyl isothio-cyanate, 2-methoxy-4-nitro-5-chlorophenyl-isothio-cyanate or 2:4-dinitrophenyl iso-thio-cyanate.

The compounds of the general Formula I can also be prepared by other methods, for example, by reacting a reactive derivative of thiocarbonic acid, for example, carbon disulfide, with an appropriately substituted aromatic amine.

The following examples illustrate the invention, the parts and percentages being by weight.

*Example 1*

(1)

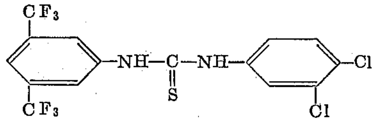

A solution of 16.2 grams of 3:4-dichloraniline in a small amount of acetonitrile is added to 27 grams of 3:5-bis-trifluoromethylphenyl isothiocyanate (boiling at 83° C. under 12 mm. Hg pressure). The reaction mixture heats up in a short time to 82° C.; it is heated for 1 hour on a boiling waterbath, and is then evaporated in vacuo to yield 3:5-bis-trifluoromethyl-3′:4′-dichlorothiocarbanilide as a solid substance which is recrystallized from benzene. The purified product melts at 138–139° C.

(2)

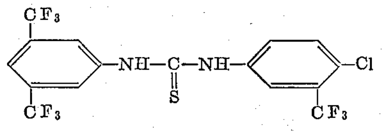

27.1 grams of 3:5-bis-trifluoromethylphenyl isothiocyanate are added to a solution of 19.5 grams of 3-amino-6-chloro-benzotrifluoride in 20 cc. of acetonitrile, and the whole is heated for 1 hour on a waterbath. The reaction mixture becomes slightly colored and thickly liquid. It is evaporated in vacuo, and then heated for 2 hours at 90° C. The crude solid product melts at 139–141° C. It is heated in a small amount of benzene in the presence of animal charcoal, and the filtered, warm solution is mixed with an equal volume of cyclohexane, whereupon 3:3′:5-tri-trifluoromethyl-4′-chlorothiocarbanilide crystallizes out. It melts at 138.5 to 139° C.

(3)

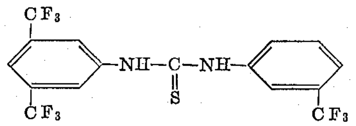

3:3′:5-tri-trifluoromethyl-thiocarbanilide is prepared as described above under (2). The crude product is dissolved in hot benzene, mixed with animal charcoal and filtered, and the clear filtrate is mixed with an equal volume of cyclohexane, whereupon crystallization sets in. The product melts at 133–134° C.

(4)

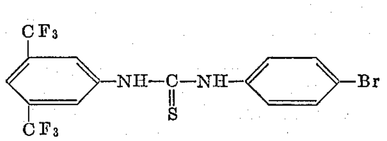

3:5-bis-trifluoromethyl-4′-bromo-thiocarbanilide is prepared in a corresponding manner. After recrystallization from a mixture of benzene and cyclohexane it melts at 163–164° C.

(5)

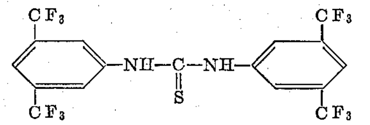

27.1 grams of 3:5-bis-trifluoromethylphenyl isothiocyanate are mixed with 22.9 grams of 3:5-bis-trifluoromethylaniline without the use of a solvent, and the mixture is heated on a boiling waterbath. The reaction mixture solidifies to a solid crystalline cake. After recrystallization from nitromethane and being washed with benzene, the resulting 3:3′:5:5′-tetra-trifluoromethyl-thiocarbanilide melts at 184.5–186° C.

(6)

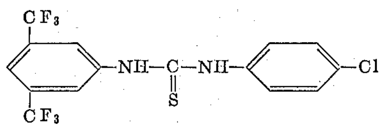

3:5-bis-trifluoromethyl-4′-chlorothiocarbanilide is prepared as described under (1) above. After recrystallization from a mixture of benzene and cyclohexane it melts at 150–151° C.

(7)

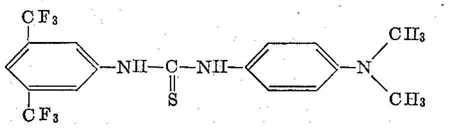

A mixture of 17.8 grams of para-N-dimethylamino-phenyl-isothiocyanate and 22.9 grams of 3:5-bis-trifluoromethylaniline is heated for several hours on a boiling waterbath. The initially liquid reaction mixture solidifies in a short time to a crystalline mass, which is then expressed on a suction filter, and 3:5-bis-trifluoromethyl-4′-N-dimethylamino-thiocarbanilide is recrystallized from benzene. It melts at 167.5–170° C.

(8)

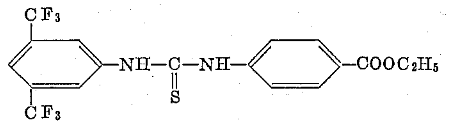

A solution of 16.5 grams of para-aminobenzoic acid ethyl ester in 15 cc. of acetonitrile is mixed with 27.1 grams of 3:5-bis-trifluoromethylphenyl isothiocyanate. After a short time the temperature rises to 65° C., and soon after 3:5-bis-trifluoromethyl-4′-carboxyethyl thiocarbanilide precipitates. It is dried in vacuo and recrystallized from acetonitrile. It then melts at 147.5–148° C.

(9)

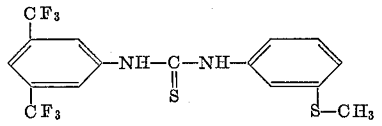

3:5-bis-trifluoromethyl-3′-thiomethyl thiocarbanilide is prepared from 3:5-bis-trifluoromethylphenyl isothiocyanate and freshly distilled 3-methylthioaniline. After recrystallization from a mixture of benzene and cyclohexane it melts at 125–127° C.

The following compound is prepared in an analogous manner:

(10)

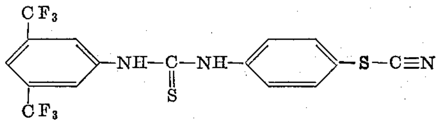

It melts at 122° C. after recrystallization from acetonitrile.

*Example 2*

(a) 10 grams of the active substance described under (1) in Example 1 and 2 grams of sulfite cellulose waste liquor are mixed with 100 cc. of water. The mixture is intensively ground to form a fine, stable dispersion, which can be diluted with water as desired.

(b) 7.5 parts of the emulsifier marketed under the trade name "Toximul MP" by Ninol Inc., Chicago, are dissolved in 72.5 parts of butanol, and 20 parts of the compound described under (1) in Example 1 are dissolved in the mixture. The solution can be diluted with water as desired.

(c) Tomato plants and celery plants were sprayed with solutions of 0.2% strength of each of the dispersions prepared as described under (a) and (b) above. 2 days after spraying, the tomato plants were infected with a spore suspension of *Alternaria solani* and of *Phytophthora infestans,* and the celery plants with a spore suspension of *Septoria apii.* The infected plants were kept for 2 days in an incubation chamber at a relative humidity of 95% to 100% and a temperature of 22–25° C. The effects produced on the celery plants were evaluated about 15 to 18 days, and those on the tomato plants 6 to 8 days, after the infection.

The fungicidal action of the preparations against *Septoria apii* on the celery was 100%, against *Alternaria solani* on the tomatoes 93%, and against *Phytophthora infestans* on the tomatoes 100%, with reference to the untreated control plants.

In the following table are given the results of further tests carried out under the conditions described under (c). Spray liquors were used that had been prepared as described under (b), except that they contained, instead of the active substance (1) of Example 1, the active substances given in the table.

| Active substance | Fungicidal action in percent | | |
|---|---|---|---|
| | Alternaria solani | Phythophthora infestans | Septoria apii |
| 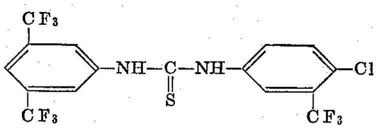 | 95 | 85 | 100 |
| 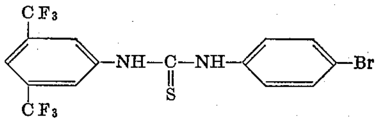 | 76 | 83 | 97 |
| 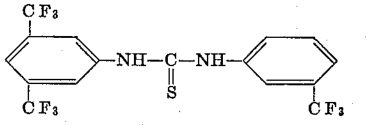 | 96 | 0 | 90 |

Similar results were obtained against the aforesaid fungi with the Compounds (5), (7) and (9) described in Example 1.

The other compounds described in Example 1 also exhibited a pronounced action against the aforesaid fungi that cause plant diseases.

*Example 3*

A solution of 5.0 g. of para-nitraniline and 10.0 g. of 3,5-bis-trifluoromethyl-phenylisothiocyanate in 50 ml. of dimethylformamide is heated at 80° C. for 4 hours. The batch is then cooled to room temperature, and 100 ml. of water added. The precipitate which forms is recrystallized from a mixture of dimethylformamide and water. There is obtained in this manner the 3,5-bis-trifluoromethyl-4'-nitro-thiocarbanilide of the formula

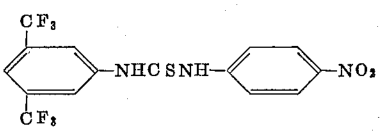

which melts at 175–177° C.

When tested according to the method set forth in Example 2, this compound showed a very good action against the phytopathogenic fungi set forth in Example 2.

What is claimed is:

1. A compound of the formula

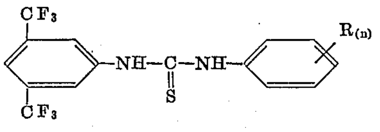

in which R represents a member selected from the group consisting of fluorine, chlorine and bromine atom, lower alkyl, lower alkoxy, $-CF_3$, $-SO_2NH_2$, $-NO_2$, $-CN$, $-SCN$, $-NR_2'$, $-COOR'$, $-SO_2R'$, $-COR'$ and $-SR'$ group, wherein R' has the meaning of a lower alkyl group and *n* is a whole number of at most 3.

2. The compound of the formula

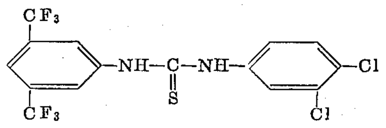

3. The compound of the formula

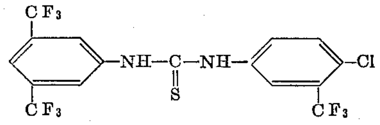

4. The compound of the formula

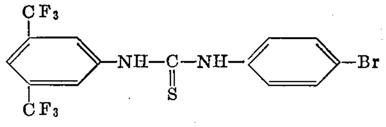

5. The compound of the formula

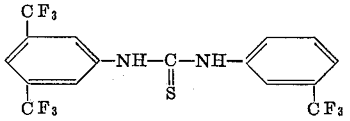

6. The compound of the formula

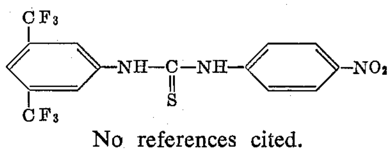

No references cited.

HENRY R. JILES, *Acting Primary Examiner.*